Feb. 10, 1970  D. J. McGEE  3,494,608

SUSPENSION

Filed Dec. 15, 1967  2 Sheets-Sheet 1

INVENTOR
DONALD J. McGEE

BY David A. Mason
ATTORNEY

Feb. 10, 1970  D. J. McGEE  3,494,608
SUSPENSION

Filed Dec. 15, 1967  2 Sheets-Sheet 2

INVENTOR
DONALD J. McGEE

BY David A. Mason
ATTORNEY

United States Patent Office 3,494,608
Patented Feb. 10, 1970

3,494,608
SUSPENSION
Donald J. McGee, Troy, Mich., assignor to
Dura Corporation
Filed Dec. 15, 1967, Ser. No. 690,999
Int. Cl. B60g 11/46, 17/04
U.S. Cl. 267—31                            14 Claims

ABSTRACT OF THE DISCLOSURE

This invention discloses a suspension for a motor vehicle or trailer. It comprises a multiple leaf spring journaled at one end to the frame of the vehicle. The other end is forced against a cam fixed to the frame. The center of the leaf spring is fixed to a beam and an axle of the vehicle. A pair of air bags are inflatable between the extremities of the beam and brackets depending from the frame near the ends of the leaf spring. The leaf spring dampens movement of the suspension when traversing bumps. It supports the vehicle at tare weight. At full load, the air bags are selectively inflatable to provide a higher spring rate and greater load capacity.

---

This invention relates generally to a suspension for a truck or bus. More specifically, this invention relates to a combination of air bags and a leaf spring for suspending a drive axle of a truck or bus.

In suspensions for trucks and buses it is necessary to provide means for taking not only vertical loads of the vehicle but also means for taking brake and acceleration loads without causing axle wind up. It is desirable to provide these functions with a minimum amount of additional weight.

It is also desirable to provide two different spring rates for a truck or bus suspension. For best performance, one spring rate should be in effect when the truck is relatively unladen, and another when the truck is relatively heavily laden.

It is also desirable thta where a combination of springs are used in suspending a truck axle, that one spring acts to dampen the effects of another to assist shock absorption when traversing bumps.

It is also desirable that the means providing spring action in a suspension for a truck be placed as close to the wheel as possible in order to reduce bending moments on the truck axle.

It is an object of this invention to provide a suspension with the above features.

Other objects of this invention will appear in the following description and appended claims, referring to the accompanying drawings forming a part of this specification.

Before explaining the present invention in detail, it is to be understood that the invention is not limited in its application to the details in construction and arrangement of parts illustrated in the accompanying drawings since the invention is capable of other embodiments and of being practiced or carried out in various ways. Also it is to be understood that phraseology and terminology employed herein are for the purpose of description and not limitation.

Figure 2:
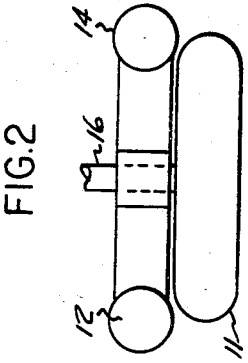
FIGURE 2 is a diagram of a portion of the preferred embodiment of this invention.
Figure 1:
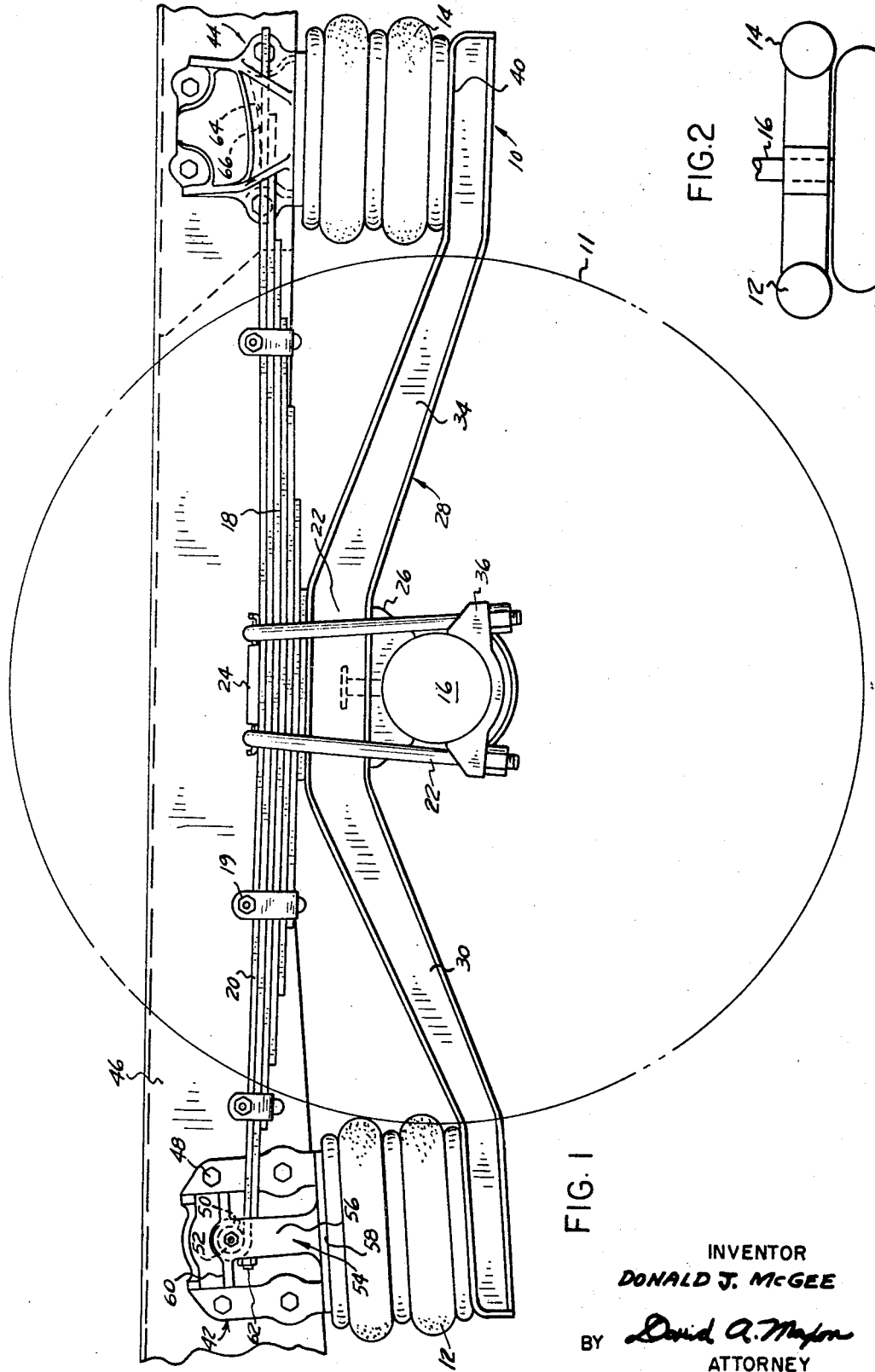
FIGURE 1 is a partial side view of a vehicle in the preferred embodiment of this invention.
Figure 3:
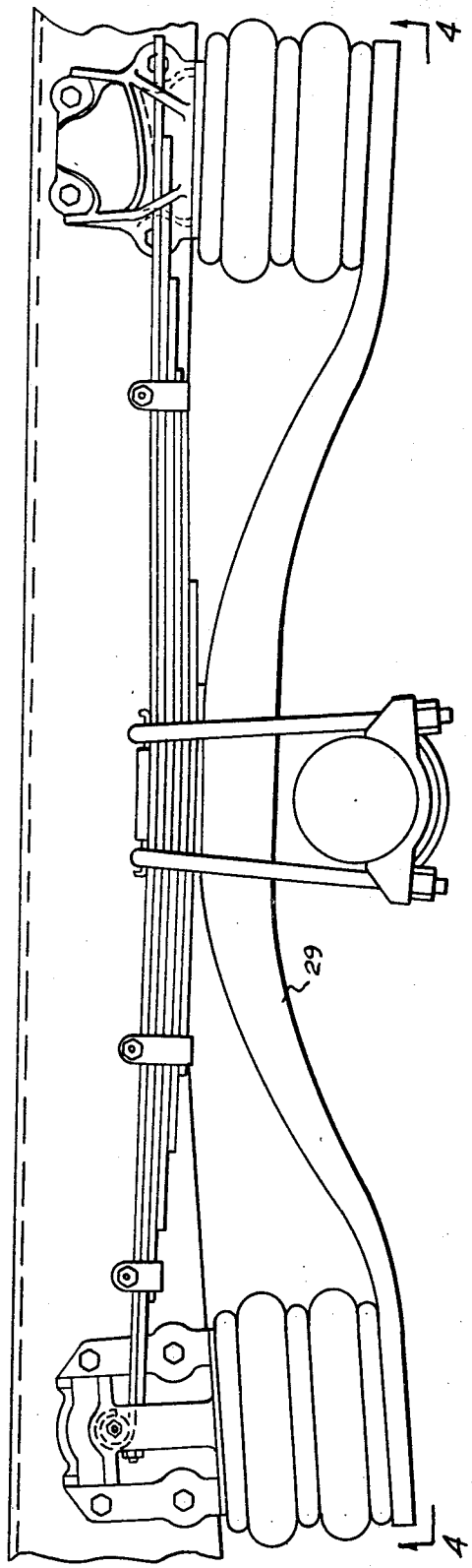
FIGURE 3 is a partial side view of a vehicle in an alternative embodiment of this invention.
Figure 4:
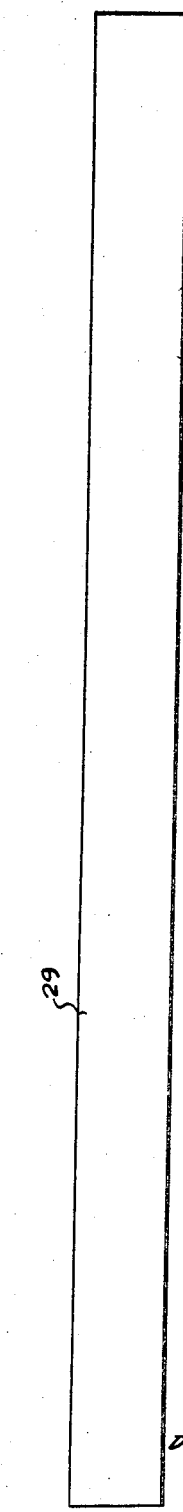
FIGURE 4 is a view of the bottom of a tapered leaf spring shown in FIGURE 3.

As shown on the drawings:

A preferred embodiment of this invention is shown by the suspension 10 in FIGURE 1. Pneumatic air bellows or air bags 12 and 14 are provided to carry a substantial portion of the vertical load of the vehicle on the suspension system. These air bags are preferably neoprene or nylon cord bags adapted for industrial or truck suspension use. The air bag 12 is placed forward of the axle 16 of the vehicle. The air bag 14 is placed aft of the axle 16 by the same distance. Both air bags have rubber bumpers that limit the extent of their collapse.

A multiple elliptical leaf spring 18 is provided to take a portion of the vertical load of the vehicle on the suspension system. The forward arm portion 20 of the multiple leaf spring 18 is designed to carry the brake and acceleration loads of the vehicle on the suspension system in a manner to be described further in detail below. The multiple leaf spring 18 is built up out of several leaves in a manner well known in the art of leaf spring construction. Clamps 19 are provided to insure the securing of the leaves to one another.

The multiple leaf spring 18 is secured to the axle 16 by means of a U-bolt 22 and plate 24. The leaf spring 18 is carried above the axle 16.

Interposed between the leaf spring 18 and the axle 16, is a spring seat 26 and beam member 28.

The beam member 28 has symmetrical arms. The arm 30 of the beam 28 extends forward and downwardly from the middle portion 32 of the beam 28. The arm 34 of the beam 28 extends downwardly and aft of the middle portion 32 of the beam member. The middle portion 32 of the beam is secured between the bottom of the leaf spring 18 and the top of the spring seat 26 by means of the above mentioned U-bolt assembly 22, and by axle cap 36.

The forward portion 38 of the beam arm 30 is secured to the forward air bag 12. The aft portion of beam arm 34 is secured to the bottom of the aft air bag 14. A cross-section of the beam member 28 reveals an I, or L, or channel shape to provide extra strength in bending. This results in a flange 42 that not only adds extra strength in bending, but provides greater surface for securing to the leaf spring 18, the spring seat 26, and the air bags 12 and 14.

The top portions of air bags 12 and 14 are secured to brackets 42 and 44 respectively. Brackets 42 and 44 are secured to the frame 46 of the vehicle preferably by bolts 48.

The forward portion 50 of arm 20 of the spring 18 is bent into a loop and attaches to a spring pin 52 that is axially fixed to a T-shaped portion 54 of the forward bracket 52. The T-shaped portion 54 has a relatively heavy central element 56 extending vertically from the bottom flange 58 of the bracket to arms 60 that extend forward and aft of the central portion 54 near the spring pin 52. A spring pin lock bolt 62 is provided in an axially fore and aft position to provide the securing of the forward end of arm 20 to the bracket 42.

The aft bracket 44 has a cam portion 64 that engages the top surface of the rear arm 66 of the spring 18.

It can be appreciated from the foregoing description of the securing of the spring 18 to the brackets 42 and 44 that the forward arm portion 20 of the spring 18 carried the acceleration and braking loads applied by the vehicle to the suspension system 10.

The spring 18 is built up in a downwardly extending direction so that the shortest leaf spring is closest to the axle. Thus the spring 18 provides a retarding or shock absorbing action against the spring action of the air bags when the axle is raised suddenly, due to interleaf friction.

It can also be appreciated by the detail of the securing of the forward end of the spring 18 to the bracket which in turn attaches to the frame of the vehicle, that a Hotchkiss-like securing is provided. This type of securing allows adjustment of the position of the axle so that it can be precisely located with respect to means for driving it.

When the vehicle is in a relatively underladen, tare weight, or bob-tail condition, the air bags need not carry vertical load. When fully laden, however, the air bags carry a significant portion of the vertical load. Thus, a different spring rate is provided for the two conditions.

The leaf spring, being relatively rigid to horizontal compression compared to vertical deflection for vertical loads, carries the entire acceleration and braking loads regardless of bob-tail or fully laden conditions.

Because no additional brackets are required, and the bags are relatively light and easy to install, weight and costs are saved by practice of this invention. Also, it can be installed on existing vehicles without special adaptation.

A pneumatic valve controls the pressure in the air bags. In the preferred embodiment of this invention, the opening and closing of this valve is controlled by a lever that moves in response to a change of vertical displacement of the frame with respect to the bottom of an air bag. Thus, a servomechanism is provided to regulate spring rate of the air bags at a predetermined load. This regulation is effective regardless of heating of the bags by high frequency oscillation of load on the suspension.

In alternative embodiments of this invention, the beam member 28 is replaced by a leaf spring 29. This leaf spring may have multiple leaves, or it may be tapered.

I claim:
1. In a motor vehicle suspension, the improvements comprising:
   fore and aft brackets fixed to the vehicle frame;
   a built up leaf spring journaled at its fore end to the fore bracket, and contacting at its aft end a cam surface on the aft bracket;
   a fore and aft extending beam member secured at its central portion to the central portion of the leaf spring;
   an axle secured to the center portions of the leaf spring and beam;
   and a pair of pneumatic bellows members each secured between a different end of the beam and a different one of said brackets.
2. The apparatus of claim 1 wherein the spring rates of said leaf spring and said air bags differ.

3. The apparatus of claim 1 and means deactivating said air bags from carrying any structural load when the vehicle is running bob tail.
4. The apparatus of claim 3 and means inflating said air bags to carry a substantial portion of the vertical load when the vehicle is fully laden.
5. The apparatus of claim 1 wherein the forearm of said leaf spring is relatively more rigid to horizontal compression than to vertical deflection.
6. The apparatus of claim 1 and means directing said leaf spring to dampen the downward motion of said air bags after the axle is suddenly raised.
7. The apparatus of claim 1 wherein said air bags are separated at a relatively long fore and aft distance from sid axle, and are displaced inboard a relatively short distance from the centers of the wheels journaled on said axle, said inboard displacement being several orders of magnitude less than said fore and aft distance.
8. The apparatus of claim 1 wherein said air bags are symmetrically loaded with respect to said axle.
9. The apparatus of claim 1 wherein said beam member is a leaf spring.
10. The apparatus of claim 1 wherein said beam member is a multiple leaf spring.
11. The apparatus of claim 1 wherein said beam member is a tapered leaf spring.
12. The apparatus of claim 1 and a pneumatic valve responsive to vertical displacement of said frame, said valve controlling air pressure in said bags.
13. The apparatus of claim 12 wherein said displacement is with respect to said axle.
14. The apparatus of claim 12 wherein said displacement is with respect to the bottom of one of said air bags.

References Cited

UNITED STATES PATENTS

| | | | |
|---|---|---|---|
| 2,420,883 | 1/1960 | Hollert | 267—32 |
| 3,231,258 | 1/1966 | Brownyer et al. | 280—124 |

JAMES B. MARBERT, Primary Examiner

U.S. Cl. X.R.

280—124